(12) United States Patent
Takeo

(10) Patent No.: US 9,239,694 B2
(45) Date of Patent: Jan. 19, 2016

(54) IMAGE FORMING APPARATUS, METHOD, AND STORAGE MEDIUM FOR ALLOWING OR INHIBITING REPRINT OF DATA BASED ON USER AUTHENTICATION

(71) Applicant: CANON KABUSHIKI KAISHA, Tokyo (JP)

(72) Inventor: Akinori Takeo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/654,001

(22) Filed: Oct. 17, 2012

(65) Prior Publication Data

US 2013/0114101 A1    May 9, 2013

(30) Foreign Application Priority Data

Nov. 8, 2011 (JP) ................................ 2011-244984

(51) Int. Cl.
*G06K 15/00* (2006.01)
*G06F 3/12* (2006.01)

(52) U.S. Cl.
CPC ............ *G06F 3/1285* (2013.01); *G06F 3/1222* (2013.01); *G06F 3/1238* (2013.01); *G06F 3/1267* (2013.01)

(58) Field of Classification Search
CPC .... G06K 15/02; G06K 15/025; G06K 15/026
See application file for complete search history.

(56) References Cited

U.S. PATENT DOCUMENTS

| | | | | |
|---|---|---|---|---|
| 6,089,765 A * | 7/2000 | Mori | ..................... | G06F 3/1211 400/61 |
| 7,639,385 B2 * | 12/2009 | Nakata | ............... | H04N 1/00007 358/1.15 |
| 7,796,282 B2 * | 9/2010 | Yamakawa | .............. | G06F 3/121 358/1.14 |
| 2002/0027673 A1 * | 3/2002 | Roosen | .............. | H04N 1/00204 358/1.13 |
| 2003/0065404 A1 * | 4/2003 | Bhatti | ................... | G06F 3/1204 700/1 |
| 2005/0183141 A1 | 8/2005 | Sawada | | |

(Continued)

FOREIGN PATENT DOCUMENTS

| | | |
|---|---|---|
| CN | 1733495 A | 2/2006 |
| EP | 2 249 245 A2 | 11/2010 |

(Continued)

OTHER PUBLICATIONS

Oct. 30, 2014 Chinese Official Action in Chinese Patent Appln. No. 201210447290.5.
Oct. 2, 2015 Japanese Office Action in Japanese Patent Appln. No. 2011-244984.
Dec. 2, 2013 European Patent Office Communication in European Patent Appln. No. 12189069.3.

*Primary Examiner* — Barbara Reinier
*Assistant Examiner* — Henok A Shiferaw
(74) *Attorney, Agent, or Firm* — Fitzpatrick, Cella, Harper & Scinto

(57) ABSTRACT

This image forming apparatus determines, when a user authentication function of the image forming apparatus is set to be valid and a re-execution function of re-executing an executed job is set to be valid, that the re-execution function can be executed, and determines, when the user authentication function is set to be invalid, that the re-execution function cannot be executed. The apparatus stores job information of an executed job when determining that the re-execution function can be executed. The apparatus permits an authenticated user to handle stored job information when determining that the re-execution function can be executed, the user authentication succeeds, and the authenticated user has execution authority for the job.

5 Claims, 9 Drawing Sheets

(56) References Cited

U.S. PATENT DOCUMENTS

| | | | | |
|---|---|---|---|---|
| 2006/0023247 | A1* | 2/2006 | Yamakawa | G06F 3/121 358/1.14 |
| 2007/0064269 | A1* | 3/2007 | Mokuya | G03G 21/04 358/1.15 |
| 2009/0086967 | A1* | 4/2009 | Ozawa | H04L 6/3226 380/44 |
| 2010/0031192 | A1* | 2/2010 | Kong | H04N 1/00 715/810 |
| 2010/0284035 | A1 | 11/2010 | Kil et al. | |

FOREIGN PATENT DOCUMENTS

| | | |
|---|---|---|
| JP | 2006-043962 A | 2/2006 |
| JP | 2006-094054 A | 4/2006 |
| JP | 2008-225682 A | 9/2008 |
| KR | 10-2006-0048992 A | 5/2006 |
| KR | 10-2010-0121355 A | 11/2010 |

* cited by examiner

FIG. 3

301 — MANAGEMENT SETTING > PRINT FUNCTION SETTING

☑ AUTHENTICATE USER
☐ VALIDATE RE-EXECUTION

302 — MANAGEMENT SETTING > PRINT FUNCTION SETTING

☑ AUTHENTICATE USER
☑ VALIDATE RE-EXECUTION

303 — MANAGEMENT SETTING > PRINT FUNCTION SETTING

☐ AUTHENTICATE USER
☐ VALIDATE RE-EXECUTION

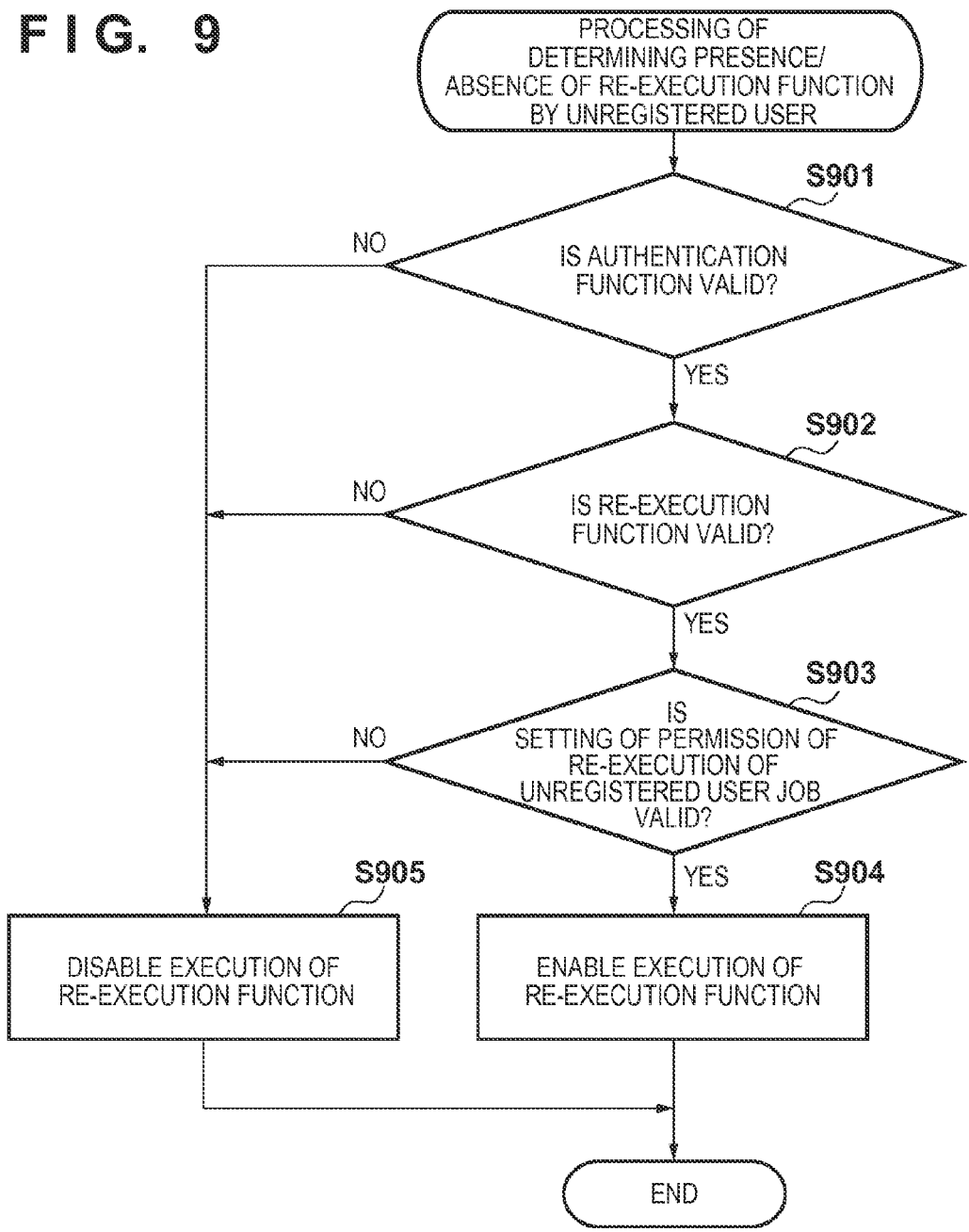

IMAGE FORMING APPARATUS, METHOD, AND STORAGE MEDIUM FOR ALLOWING OR INHIBITING REPRINT OF DATA BASED ON USER AUTHENTICATION

BACKGROUND OF THE INVENTION

1. Field of the Invention

The present invention relates to a job re-execution function in an image forming apparatus having a user authentication function, and a method of controlling the same.

2. Description of the Related Art

Japanese Patent Laid-Open No. 2006-43962 has proposed an image forming apparatus which executes a job and stores the contents of a job such as a print or a transmission job (to be referred to as an original job or the original execution of the job hereinafter and the function of which may be referred to as the execution function), and then re-executes the job (the function of which will be referred to as a re-execution function hereinafter). This conventional technique is designed to store the contents of a job for re-execution depending on whether permission for the re-execution of the job is given at the time of the original execution of the job. In order to re-execute a job, a user may select an already-executed job from a print log and cause the re-execution of the selected job. In order to re-execute a job in accordance with an instruction from a user who has the proper authority, the conventional method includes determining whether the original execution of the job was permitted based on user authentication of the user that is selecting the re-execution of the job.

The conventional technique, however, has the following problems. For example, according to the conventional technique, since only a user having the proper authority can issue an instruction to perform the re-execution function, user authentication is again performed to determine whether to permit the re-execution function. On the other hand, this technique decides whether to enable the storage and re-execution of a job at the time of the execution of the original job, based on whether permission/inhibition of re-execution of each job is designated or the re-execution function is valid. This raises the problem of a job for re-execution potentially being stored and enabled to be re-executed in spite of the user authentication function being invalid. In addition, a certain application which executes a job allows an unauthorized user to execute the job and handle a job stored by an unregistered user. For example, the unauthorized person can re-execute or delete a job. That is, even unauthorized users can re-execute jobs.

SUMMARY OF THE INVENTION

It is desired to realize an image forming apparatus which suitably controls the storage of a processed job and which handles the stored job based on settings and user information in the apparatus in order to solve the above problems.

One aspect of the present invention provides an image forming apparatus comprising: a job execution unit that executes a job concerning image formation; a determination unit that determines, when a user authentication function of the image forming apparatus is set to be valid and a re-execution function of re-executing a job executed by the job execution unit is set to be valid, that the re-execution function is executable, and determines, when the user authentication function is set to be invalid, that the re-execution function is not executable; a storage unit that stores job information of a job executed by the job execution unit in the image forming apparatus if the determination unit determines that the re-execution function is executable; and a control unit that permits an authenticated user to handle job information stored in the storage unit when the determination unit determines that the re-execution function is executable, the user authentication succeeds, and the authenticated user has execution authority for the job.

Another aspect of the present invention provides a method for controlling an image forming apparatus, the method comprising: executing a job concerning image formation by a job execution unit; determining, by a determination unit, when a user authentication function of the image forming apparatus is set to be valid and a re-execution function of re-executing a job executed in the executing the job is set to be valid, that the re-execution function is executable, and determines, when the user authentication function is set to be invalid, that the re-execution function is not executable; storing, by a storage unit, job information of a job executed in the executing the job in the image forming apparatus if it is determined in the determining that the re-execution function is executable; and permitting, by a control unit, an authenticated user to handle job information stored in the storing when it is determined in the determining that the re-execution function is executable, the user authentication succeeds, and the authenticated user has execution authority for the job.

Still another aspect of the present invention provides a computer-readable storage medium storing a computer program for causing a computer to execute each step in a method of controlling the image forming apparatus.

Further features of the present invention will be apparent from the following description of exemplary embodiments with reference to the attached drawings.

BRIEF DESCRIPTION OF THE DRAWINGS

FIG. 3 is a view showing a setting screen for setting a user authentication function and a re-execution function;

FIG. 9 is a flowchart showing presence/absence determination processing for a re-execution function according to the second embodiment.

DESCRIPTION OF THE EMBODIMENTS

Figure 1:
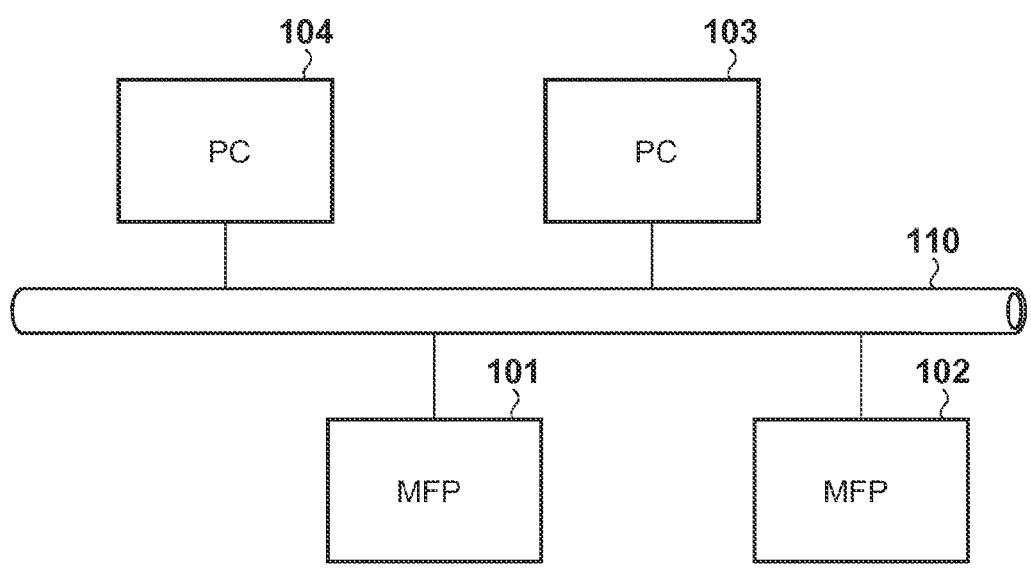
FIG. 1 is a block diagram showing a network arrangement.

Embodiments of the present invention will now be described in detail with reference to the drawings. It should be noted that the relative arrangement of the components, the numerical expressions and numerical values set forth in these embodiments do not limit the scope of the present invention as defined by the claims.

First Embodiment

<Arrangement of Image Forming System>

The first embodiment of the present invention will be described below with reference to FIGS. 1 to 7. An example of the arrangement of an image forming system according to this embodiment will be described first with reference to FIG. 1. Reference numeral 101 denotes an image forming apparatus according to this embodiment. This apparatus is an MFP (Multi Function Peripheral) including a scanner and a printer. An MFP 102 is also an image forming apparatus having the same functions as those described above.

A PC (Personal Computer) 103 is an information processing apparatus, which is connected to the MFPs 101 and 102 via a LAN 110. The PC 103 can request the MFPs 101 and 102 to perform processing or can perform state management for the MFPs 101 and 102 and job management for a job such as a scan, print, copy, or similar job. A PC 104 is an authentication server, which is connected to the MFPs 101 and 102 via the LAN 110. The PC 104 can perform user authentication in response to user authentication requests from the MFPs 101 and 102 and return authentication results to them.

There is no intention to limit the numbers of the respective types of apparatuses to be installed. This arrangement is merely an example. That is, the image forming system of the present invention may include more MFPs and PCs. Alternatively, this system may include other image forming apparatuses other than MFPs, for example, SFPs (Single Function Peripherals), printers, FAX (facsimile) apparatuses, and copying machines.

<Arrangement of Image Forming Apparatus>

The hardware arrangement of the MFPs 101 and 102 according to this embodiment will be described next with reference to FIG. 2. An example of the hardware arrangement of the MFP 101 will be described below. Since the hardware arrangement of the MFP 102 is the same as that of the MFP 101, a description of it will be omitted.

The MFP 101 includes a CPU (central processing unit) 201, a RAM (random access memory) 202, an LCD (liquid crystal display) 203, an operation unit 204, a ROM (read-only memory) 205, a scanner engine 206, a printer engine 207, a hard disk 208, a network I/F (interface) 209, and a card reader 210. These components are mutually connected to each other via a system bus 220.

The ROM 205 stores a program for controlling the MFP 101. The program is loaded to the RAM 202 and executed by the CPU 201, as needed. In addition to the control program, the ROM 205 and the hard disk 208 store attribute information indicating the function and state of the image-forming apparatus itself and those of a job to be processed by the image-forming apparatus, job data as an output target, job data received and accumulated, and the like.

CPU 201 communicates with the outside via the network I/F 209. The network I/F 209 may include a wireless communication network I/F such as USB, IEEE1394, or Bluetooth® as well as an Ethernet® interface. The CPU 201 displays a message to the user or receives an input from the user via the LCD 203 or the operation unit 204. The CPU 201 also reads input data from an IC card or a magnetic card via the card reader 210.

Figure 2:
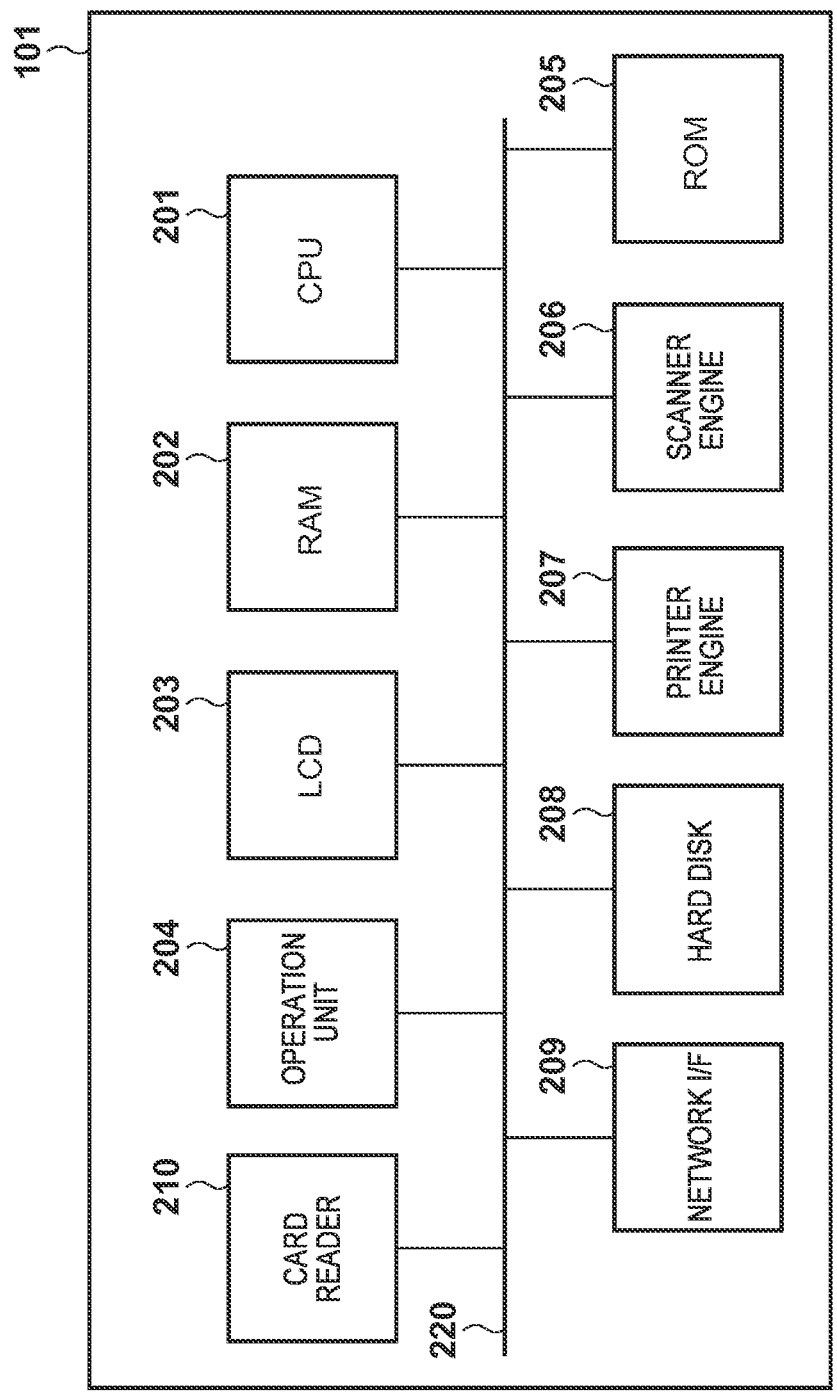
FIG. 2 is a hardware arrangement of an image forming apparatus.

In this embodiment, unless otherwise specified, in the image forming apparatus shown in FIG. 2, the CPU 201 receives, via the system bus 220, user inputs via the operation unit 204 or receives input data from an IC card or a magnetic card via the card reader 210. The CPU 201 also comprehensively controls the RAM 202, the LCD 203, the ROM 205, the scanner engine 206, the printer engine 207, the hard disk 208, and the network I/F 209 via the system bus 220, and executes various kinds of processing.

The scanner engine 206 can execute a scan job to generate image data by reading a sheet document. The printer engine 207 can execute a print job to output the data received from the outside (e.g. from an external source). Using the scanner engine 206 and the printer engine 207, a copy job can be executed to copy a sheet document. Services provided by the MFP 101 include, for example, printing, scanning, copying, FAX transmission, FAX reception, document storage, document transmission, and the like and will be generally referred to as jobs.

<Screen Example>

FIG. 3 is an example of a setting screen by which the MFP 101 according to this embodiment prompts the user to make settings to validate/invalidate the user authentication function and the re-execution function. When a function is valid, it is performable. The MFP 102 can also display other screens that will be described below. The CPU 201 of the MFP 101 executes a program stored in the ROM 205 to display these screens on the LCD 203.

Screens 301, 302, and 303 indicate examples of settings on setting screens for the print function which the manager of the MFP 101 can set. These screens prompt the user to make settings to validate/invalidate the user authentication function concerning the print function and validate/invalidate the re-execution function. Although FIG. 3 shows a setting screen for the print function, a setting target may be any function for a job which can be executed. For example, such functions include not only the print function but also a copy function, scan function, and document transmission function (or indeed any other function enabling a job to be executed). In addition, such a screen may be configured as a setting window common to the respective functions.

On the screen 301, since "authenticate user" is set and "validate re-execution" is not set, the apparatus is set to perform user authentication for the print function and to invalidate the re-execution function for a job. In addition, if the setting "authenticate user" is canceled, the screen changes to the screen 303, in which "validate re-execution" is not available.

On the screen 302, since "authenticate user" and "validate re-execution" are both set, the apparatus performs user authentication for the print function, and is set to validate the re-execution function for a job. When the setting "validate re-execution" is canceled, the screen changes to the screen 301. When the setting "authenticate user" is canceled, the apparatus deletes (or at least makes unavailable) the setting "validate re-execution" and makes the screen change to the screen 303. The apparatus may be configured to delete image data or set values for a job which are stored in the hard disk 208 for the re-execution of the job in step S604 in FIG. 6 (to be described later), when screen transition is performed from the screen 302 to the screen 301 or 302.

On the screen 303, since "authenticate user" is not set, it indicates that the print function is set so as not to perform user authentication. If setting is made so as not to perform user authentication, the apparatus allows a user to execute the print function without any authentication. For this reason, the apparatus is configured to inhibit the user from selecting "validate re-execution", when "perform user authentication" is not set. When "authenticate user" is set, the screen changes to the screen 301.

<Determination of Presence/Absence of Re-Execution Function>

Figure 4:
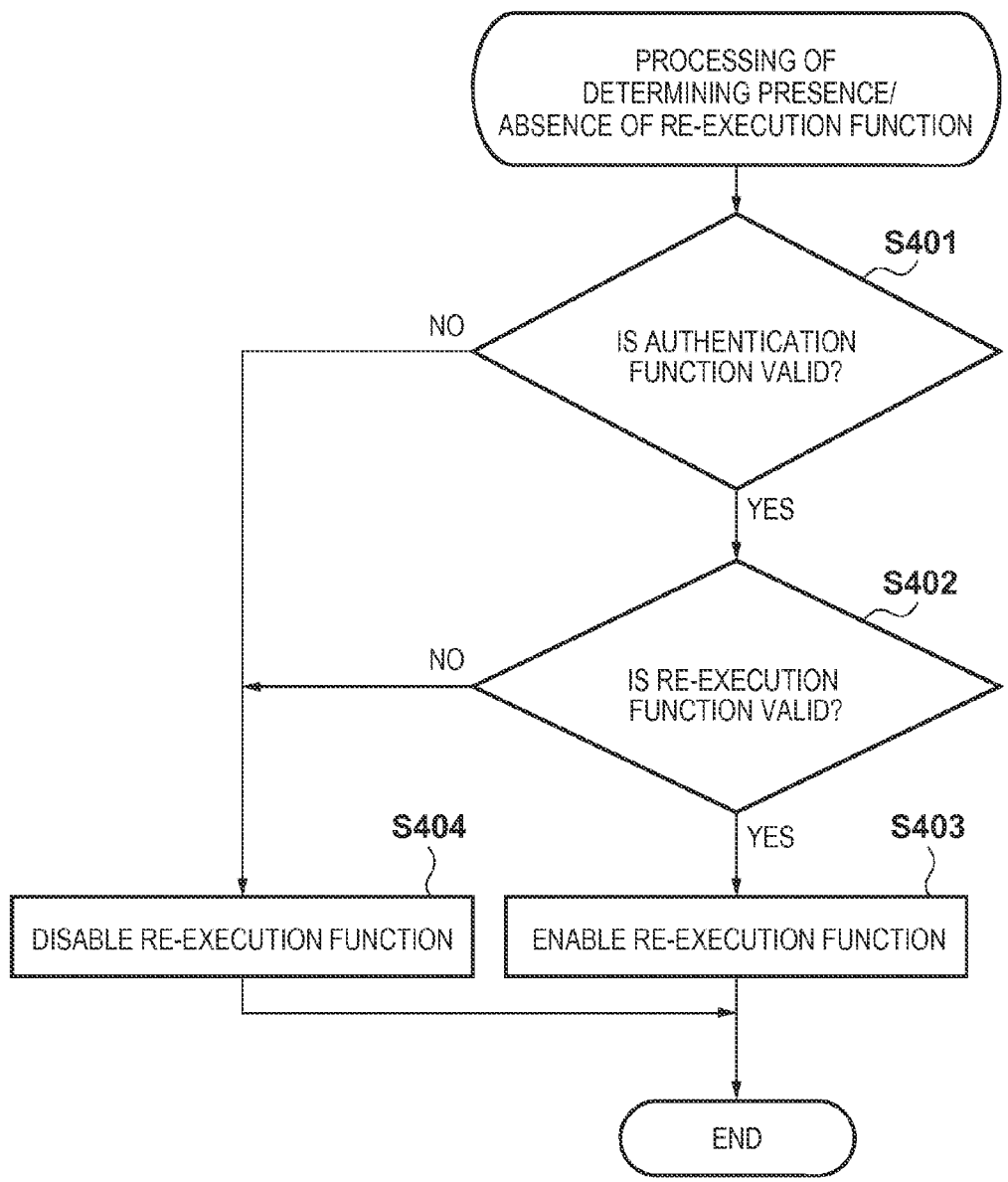
FIG. 4 is a flowchart showing presence/absence determination processing for the re-execution function which is performed by the image forming apparatus.

A processing procedure for deciding whether it is possible to perform the re-execution function in the MFP 101 according to this embodiment will be described next with reference to FIG. 4. The CPU 201 of the MFP 101 implements the following processing by executing a program stored in the ROM 205.

In step S401, the CPU 201 determines whether the user authentication function is valid. This embodiment may have an arrangement configured to determine whether the user authentication function is valid that depends on whether "authenticate user" is set on the screen shown in FIG. 3. Assume that, for example, a job to be executed is a print job. In this case, if the system is configured to issue an execution instruction only when the print job which can be executed by the MFP 101 is an application with an authentication function, the CPU 201 may determine in step S401 that the user authentication function is valid. In addition, it is possible to determine the presence/absence of a user authentication function depending on whether valid user authentication information is set for a job to be executed. According to another arrangement, it is possible to determine that the user authentication function is valid when an external apparatus with a user authentication function is connected via the system bus 220 and made valid. If the CPU 201 determines that the user authentication function is valid, the process advances to step S402. If the CPU 201 determines that the user authentication function is invalid, the process advances to step S404. When the process advances to step S404, the CPU 201 determines, according to the screen shown in FIG. 3, whether "validate re-execution" is set. If "validate re-execution" is set, the CPU 201 may delete or change the setting (i.e. the CPU may disable the re-execution function) so that re-execution is no longer valid when the authentication function is invalid.

In step S402, the CPU 201 determines whether the setting of the re-execution function is valid, according to the screen shown in FIG. 3, in accordance with whether "validate re-execution" is set. If "validate re-execution" is set, the CPU 201 determines that the setting of the re-execution function is valid, and the process advances to step S403. If "validate re-execution" is not set, the process advances to step S404.

In step S403, the CPU 201 decides that the re-execution function can be performed, enables the re-execution function and terminates the processing. In contrast, in step S404, the CPU 201 terminates the processing upon deciding that the re-execution function cannot be performed and it disables the re-execution function.

<User Authentication>

Figure 5:
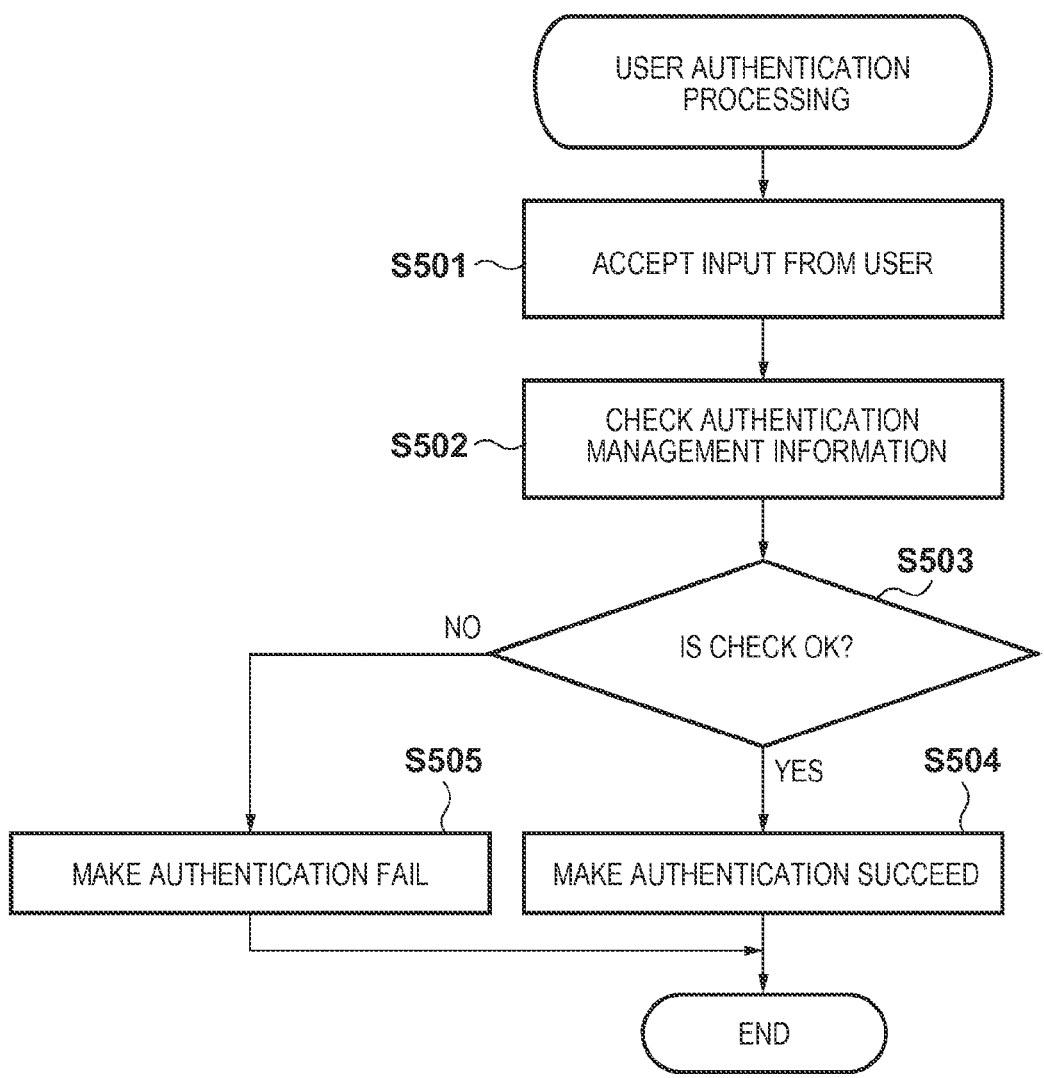
FIG. 5 is a flowchart showing user authentication processing performed by the image forming apparatus.

User authentication processing performed by the MFP 101 according to this embodiment based on externally input information (by a user) will be described next with reference to FIG. 5. The CPU 201 of the MFP 101 implements the following processing by executing a program stored in the ROM 205.

In step S501, the CPU 201 accepts authentication information input from the user via the operation unit 204. Authentication information is input data for user authentication. In this embodiment, this information indicates the ID (user ID) for identifying the user and a password which is decided in advance to authenticate the user. The arrangement of authentication information is not limited to the above user ID and password. This information may be input data which can be checked with authentication management information in step S502. Note that as a method of inputting authentication information to be accepted in step S501, it is possible to use a method of inputting information from an IC card or a magnetic card via the card reader 210 as well as a user input method via the operation unit 204.

In step S502, the CPU 201 checks the authentication information input in step S501 with authentication management information that may be stored in the hard disk 208. It is not necessary to store the authentication management information in the MFP 101. For example, the CPU 201 of the MFP 101 may transmit the authentication information input and accepted in step S401 to the PC 104 via the network I/F 209, and perform the determination in step S503 based on an authentication result received from the PC 104. In this case, the PC 104 checks the authentication information transmitted from the MFP 101 and received via the LAN 110 with the authentication management information held in the PC 104, and transmits the check result to the MFP 101.

In step S503, the CPU 201 determines the check result in step S502. If the CPU 201 determines that the check has succeeded, the process advances to step S504. If the check has failed, the process advances to step S505. In step S504, the CPU 201 sets an authentication success as a user authentication result and terminates the processing. In step S505, the CPU 201 sets an authentication failure as a user authentication result, and terminates the processing.

<First Job Execution Processing>

Figure 6:
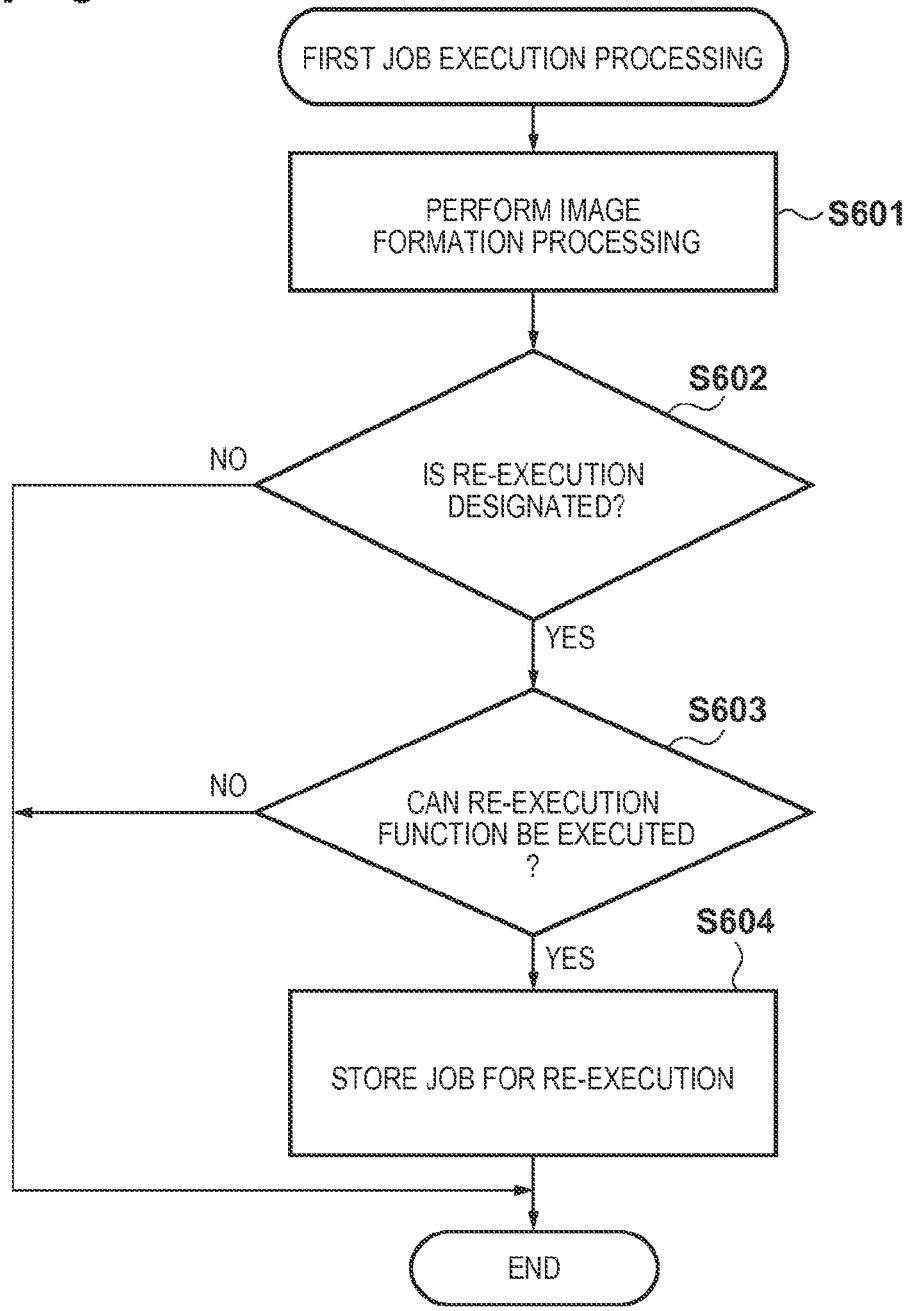
FIG. 6 is a flowchart showing the first job execution processing according to the first embodiment.

The first job execution processing processed by the MFP 101 according to this embodiment will be described next with reference to FIG. 6. In this case, the "first job execution processing" workflow refers to the first or original execution of a received job (an "original job"). The CPU 201 of the MFP 101 implements the following processing by executing a program stored in the ROM 205.

In step S601, the CPU 201 executes image formation processing in accordance with the job received via the network I/F 209 or the operation unit 204. In step S602, the CPU 201 determines whether permission to re-execute the job is designated. If the permission for re-execution of the job is designated, the CPU 201 determines that re-execution is permitted as a job setting. The process then advances to step S603. If the permission of the re-execution of the job is not designated, the CPU 201 determines that re-execution is not permitted as a job setting, and terminates the processing.

In step S603, the CPU 201 determines whether to permit or inhibit the re-execution function described with reference to FIG. 4. If the CPU 201 determines that the re-execution function can be performed, the process advances to step S604. If the CPU 201 determines that the re-execution function cannot be performed, the CPU 201 terminates the processing without performing the re-execution job. In step S604, the CPU 201 stores, in the hard disk 208, job information for re-executing the job accepted and processed in step S601 in a form that allows the re-execution of processed image data and set values for a job, and stores them in the hard disk 208 in an executable form. Note that the form in which information is stored in the hard disk 208 may include information of a user who is authenticated at the time of original execution and/or at the time of re-execution of a job.

This embodiment is configured such that only when the permission of re-execution is designated in step S602, image data processed in a job and set values for a job are stored in the form that allows re-execution. However, the embodiment of the present invention may be configured not to execute step S602. If, for example, the embodiment is configured to execute processing in step S604 upon determining in step S603 that the re-execution function is valid, it is possible to store image data and set values for a job for re-execution regardless of an instruction from the user.

<Second Job Execution Processing>

Figure 7:
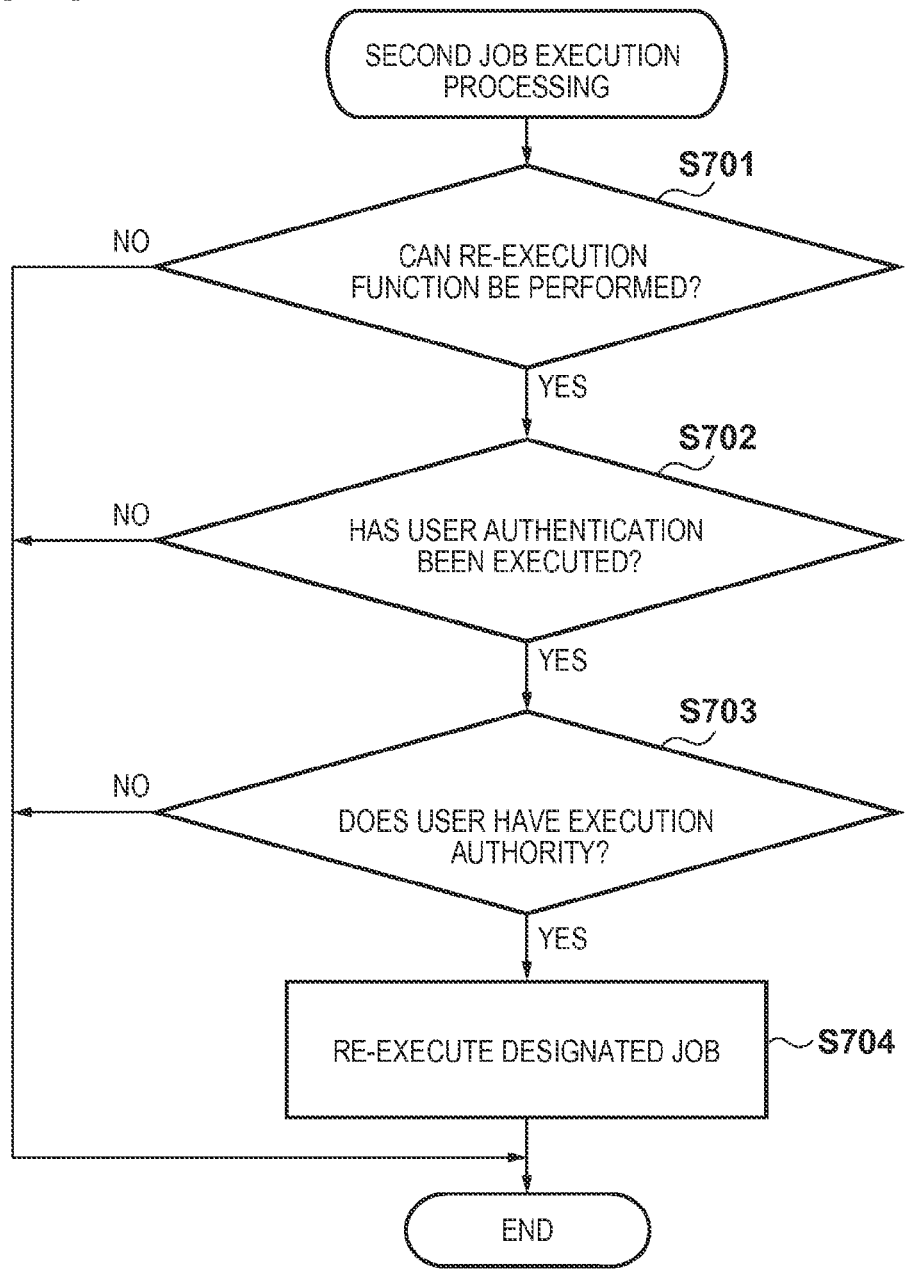
FIG. 7 is a flowchart showing the second job execution processing according to the first embodiment.

The second job execution processing performed by the MFP 101 according to this embodiment will be described next with reference to FIG. 7. In this case, the second job execution processing indicates the second and subsequent re-execution processing by storing a previously-received job (original job). The CPU 201 of the MFP 101 implements the following processing in accordance with a program stored in the ROM 205.

The CPU 201 performs the following processing when no execution instruction is issued that reflects a function setting for the MFP 101 described with reference to FIG. 3. For example, this processing is performed when the PC 103 issues an instruction for a re-execution job to the MFP 101 via the LAN 110 after "validate re-execution" is set on the screen shown in FIG. 3 and image data and set values for a job are stored for re-execution by the processing in FIG. 6. In particular, the processing is performed when image data and set values for a job stored for re-execution are stored even if the setting "validate re-execution" is removed from the screen shown in FIG. 3.

If the CPU 201 determines in step S701 that the re-execution function described with reference to FIG. 4 can be performed, the process advances to step S702. If the CPU 201 determines that the re-execution function cannot be performed, the CPU 201 displays, on the LCD 203, a screen indicating that the re-execution function cannot be performed, and terminates the processing without re-executing the job.

In step S702, the CPU 201 determines whether the user authentication processing described with reference to FIG. 4 has been performed. If the CPU 201 determines that user authentication processing has been performed, the process advances to step S703. It is then determined whether a specific user is the user for whom authentication has been performed. If user authentication processing has not been performed, or the user in question is not the user with execution authority, the CPU 201 terminates the processing.

The CPU 201 also determines in step S703 whether the user who has been authenticated by user authentication processing is provided with a re-execution authority for the job. The CPU 201 determines re-execution authority for a job by checking user information of the user (the owner of a job) who instructed the first job execution processing corresponding to the job to be re-executed in the second job execution processing. In addition, the CPU 201 may manage an execution authority for each user, manage an execution authority for each job, or determine execution authority based on a combination of management schemes. If the CPU 201 determines that the user has the re-execution authority for the job, the process advances to step S704. In step S704, the CPU 201 re-executes the designated job and completes the processing. Upon determining that the user has no execution authority, the CPU 201 displays, on the LCD 203, a screen indicating that the user has no re-execution authority, and terminates the processing without re-executing the job.

As described above, according to the first embodiment, the MFP 101 determines whether the user authentication function is valid, and can invalidate the user authentication function. This embodiment can be configured not to perform job storage processing that allows re-execution of the job if the re-execution function is invalid. In addition, the embodiment can be configured not to perform re-execution processing of a job even if an instruction to re-execute the job is externally issued via the network I/F 209. This allows only the proper authority of a user based on user authentication to issue an instruction to re-execute a job. Although this embodiment has exemplified re-execution of a job, it is possible to control deletion processing of a stored job in the same manner as described above. That is, the present invention can properly control access to a stored job.

Second Embodiment

Figure 8:
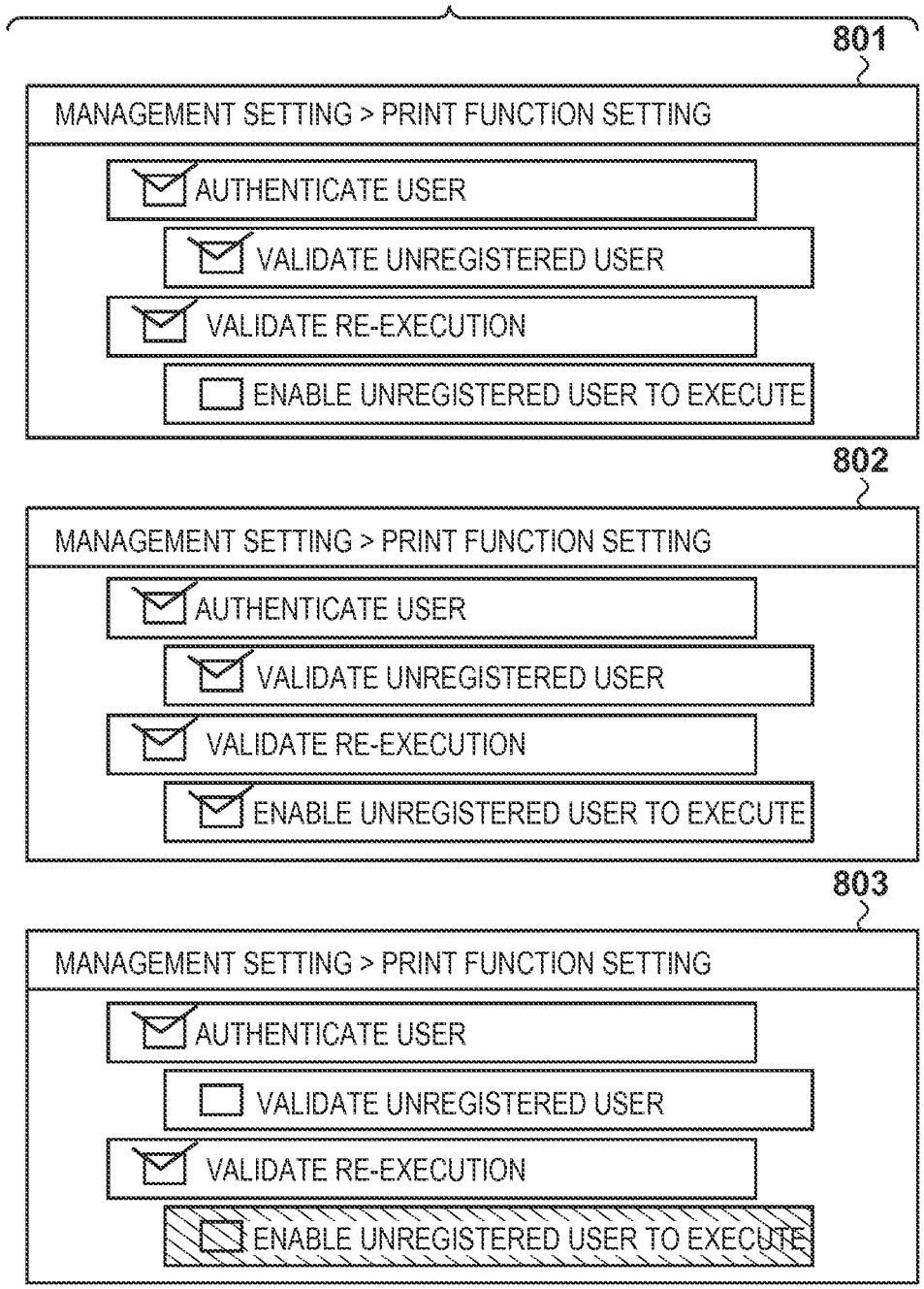
FIG. 8 is a view showing an example of a setting screen for an unregistered user according to the second embodiment.

The second embodiment of the present invention will be described next with reference to FIGS. 8 and 9. Mainly differences with respect to the first embodiment will be described below. A description of the same arrangement and technique as those in the first embodiment will be omitted. A setting screen for prompting the user of an MFP 101 according to this embodiment to determine whether to validate an unregistered user or to permit an unregistered user to issue an instruction to re-execute a job, in addition to the settings described with reference to FIG. 3, will be described first with reference to FIG. 8. In this case, an unregistered user is, for example, one for whom proper user authentication information cannot be set (specified) with respect to a print job input from an external PC 103 via a network I/F 209, when the user authentication function is valid. That is, when an unregistered user is valid, even if no authentication management information is included in the information accepted in step S501, an authentication success is determined.

Screens 801 to 803 are used to allow the execution of a job by authentication using a predetermined unregistered user only for a corresponding job type. Assume that unregistered users in this embodiment include guest users. A guest user indicates a user account for allowing even a user whose user information allowing authentication as authentication management information is not stored in advance in a hard disk 208 of the MFP 101 to use the MFP 101 when the user authentication function is valid.

The screens 801 to 803 are print function setting screens, each of which can be set by the manager. "Validate unregistered user" indicates a setting for determination whether to permit a predetermined user who is not specified to perform user authentication at the time of user authentication. In addition, "enable unregistered user to execute" indicates a setting for permitting the issuance of an instruction to perform a re-execution job, when the user is authenticated as an unregistered user described above.

When "enable unregistered user to execute" is set on the screen 801, the screen changes to the screen 802. When the setting "validate unregistered user" is canceled on the screen 802, the setting "enable unregistered user to execute" is canceled, and the screen changes to the screen 803. When the screen changes to the screen 803, it is possible to delete job image data and set values of a job which can be re-executed by an unregistered user. When "validate unregistered user" is set on the screen 803, the screen changes to the screen 801.

The process of determining whether to process a job execution instruction issued by an unregistered user based on the settings described with reference to FIG. 8, in addition to the first job execution processing and the second job execution processing described with reference to FIGS. 6 and 7, will be described next with reference to FIG. 9. The flowchart shown in FIG. 9 shows the processing to be performed when a given user is authenticated as an unregistered user by the user authentication processing described with reference to FIG. 5. The CPU 201 of the MFP 101 implements the following processing by executing a program stored in the ROM 205.

Determination processing performed in steps S901 and S902 is the same as that in steps S401 and S402 described with reference to FIG. 4, and hence a description of the processing will be omitted. In step S903, the CPU 201 determines whether the re-execution of a job by an unregistered user is valid, in accordance with whether "enable unregistered user to execute" is set on the screen shown in FIG. 8. If "enable unregistered user to execute" is set, the process advances to step S904, in which the CPU 201 decides that the re-execution function for an unregistered user is valid. If "enable unregistered user to execute" is not set, the process advances to step S905, in which the CPU 201 decides that the re-execution function for an unregistered user is invalid, and terminates the processing.

As has been described above, according to the second embodiment, even if an unregistered user is set to be valid upon determination of whether the unregistered user can re-execute a job, the MFP 101 can re-execute the job by allowing only the proper authority of a user to issue an instruction to re-execute.

Other Embodiments

Aspects of the present invention can also be realized by a computer of a system or apparatus (or devices such as a CPU or MPU (microprocessing unit)) that reads out and executes a program recorded on a memory device to perform the functions of the above-described embodiment(s), and by a method, the steps of which are performed by a computer of a system or apparatus by, for example, reading out and running a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-244984 filed on Nov. 8, 2011, which is hereby incorporated by reference herein in its entirety.

What is claimed is:

1. An image forming apparatus comprising:
   an authentication unit configured to authenticate users;
   a printing unit configured to print data; and
   a control unit configured to (a) in a case where the authentication unit has authenticated a user and the printing unit has printed the data in accordance with an instruction of the authenticated user, store log information including at least the data and a user ID of the authenticated user such that reprint of the data is limited to only the authenticated user, and (b) in a case where the printing unit has printed the data in accordance with an instruction of a non-authentication user who has not been authenticated by the authentication unit, store log information without including the data such that reprint of the data is inhibited.

2. The apparatus according to claim 1, further comprising a setting unit configured to disable a reprinting function of image data when a function of the authentication unit is disabled.

3. The apparatus according to claim 1, further comprising an LCD,
   wherein, in the case where the printing unit has printed the data in accordance with an instruction of a non-authentication user who has not been authenticated by the authentication unit, the LCD displays a screen indicating that reprint of the data is inhibited.

4. A method for controlling an image forming apparatus, the method comprising:
   authenticating a user;
   printing data;
   storing, in a case where a user has been authenticated and the data has been printed in accordance with an instruction of the authenticated user, log information including at least the data and a user ID of the authenticated user such that a reprint of the data is limited to only the authenticated user; and
   storing, in a case where the data has been printed in accordance with an instruction of a non-authentication user who has not been authenticated, log information without including the data, such that reprint of the data is inhibited.

5. A non-transitory computer readable storage medium storing a computer program for causing a computer to execute each step in a method comprising:
   authenticating a user;
   printing data;
   storing, in a case where a user has been authenticated and the data has been printed in accordance with an instruction of the authenticated user, log information including at least the data and a user ID of the authenticated user such that a reprint of the data is limited to only the authenticated user; and
   storing, in a case where the data has been printed in accordance with an instruction of a non-authentication user who has not been authenticated, log information without including the data, such that reprint of the data is inhibited.

* * * * *